J. D. Smith.
Mower.
Nº 21854
Patented Oct. 19, 1858.

Sheet 1 - 2 Sheets

J. D. Smith.
Mower.

Nº 21854 — Patented Oct. 19, 1858.

UNITED STATES PATENT OFFICE.

JOSEPH D. SMITH, OF LANCASTER, OHIO.

IMPROVEMENT IN HARVESTERS.

Specification forming part of Letters Patent No. 21,854, dated October 19, 1858.

*To all whom it may concern:*

Be it known that I, JOSEPH D. SMITH, of Lancaster, in the county of Fairfield and State of Ohio, have invented a new and useful Improvement in Harvesters; and I do hereby declare that the following is a full, clear, and exact description of the same, reference being had to the accompanying drawings, forming a part of this specification, in which—

Figure 1:
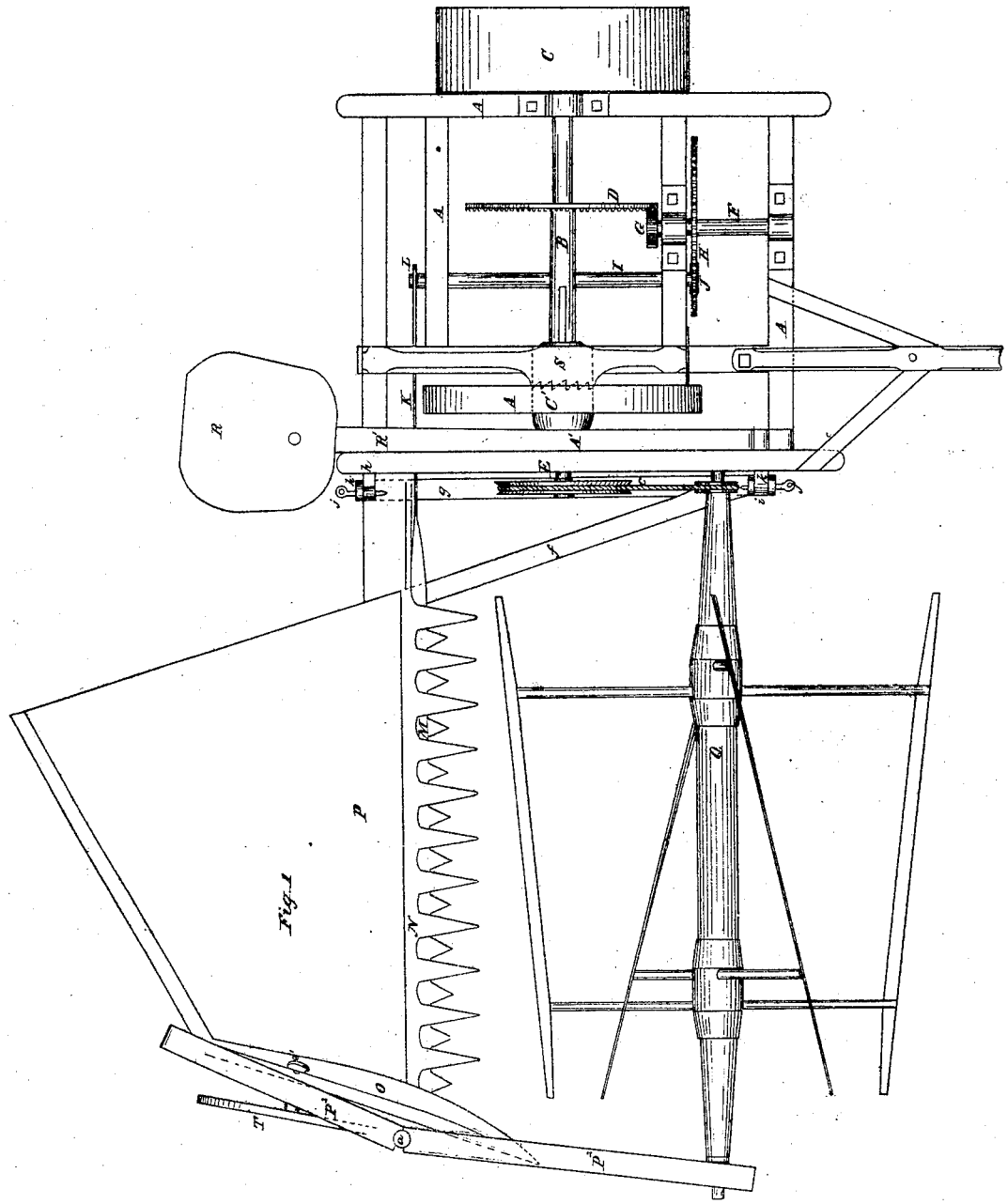
Figures 2, 3:
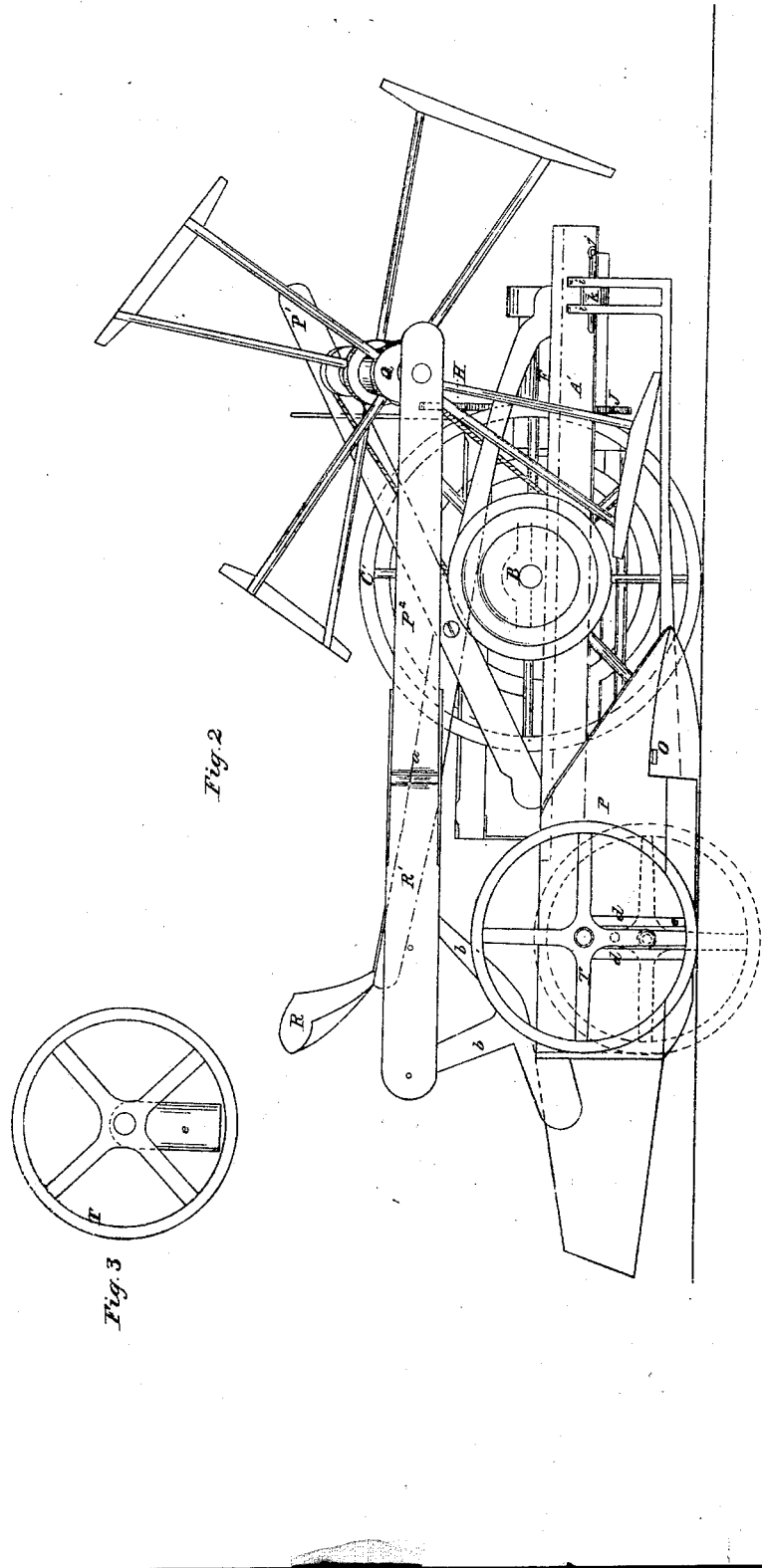

Figure 1 is a vertical or plan view. Fig. 2 is an end elevation, and Fig. 3 a side elevation, of the supporting-wheel and shank.

Similar letters of reference in each of the several figures indicate corresponding parts.

The nature of my invention consists in constructing a portion of the reel-frame with a horizontal joint near the center of its length, so that the front end of said frame may have a horizontal movement, as and for the purposes presently described.

To enable others skilled in the art to make and use my invention, I will proceed to describe its construction and operation.

A A' is the frame of the machine; B, the driving-shaft; C C', the driving-wheels; D, cutter-driver, and E reel-driver, all on the same shaft. F is an intermediate shaft carrying pinion G, which gears with D, and a pinion, H, which gives motion to crank-shaft I through its pinion J. Rod K connects crank L with cutter-bar M. The motion of shaft B thus imparts the usual reciprocating movement to bar M.

N is the finger-bar; O, end guard; P, platform, removable when the machine is converted into a mower; P' P², reel-frame, the latter bearing a horizontal joint, $a$, and being attached by rods $b$ to platform P; Q, the reel, driven by belt $c$ from its driver E; R, raker's seat; R', support of same; S, clutch-lever.

The hinge or joint $a$, near the middle of the piece P² of the reel-frame, permits a horizontal movement of the front end of said frame, and thus prevents the journals of the reel from binding in the reel-frame when the outer end of the finger-bar passes over any obstruction or roughness of the ground. In passing over obstructions there is always a tendency to twist the reel-frame and cause the journals of the reel to bind and stop the motion of the reel more or less. My improvement effectually obviates this difficulty.

What I claim as my invention, and desire to secure by Letters Patent, is—

Having a horizontal joint in and near the center of the reel-frame piece P², substantially as and for the purposes set forth.

J. D. SMITH.

Witnesses:
G. YORKE ATLEE,
EDM. F. BROWN.